Figure 1:
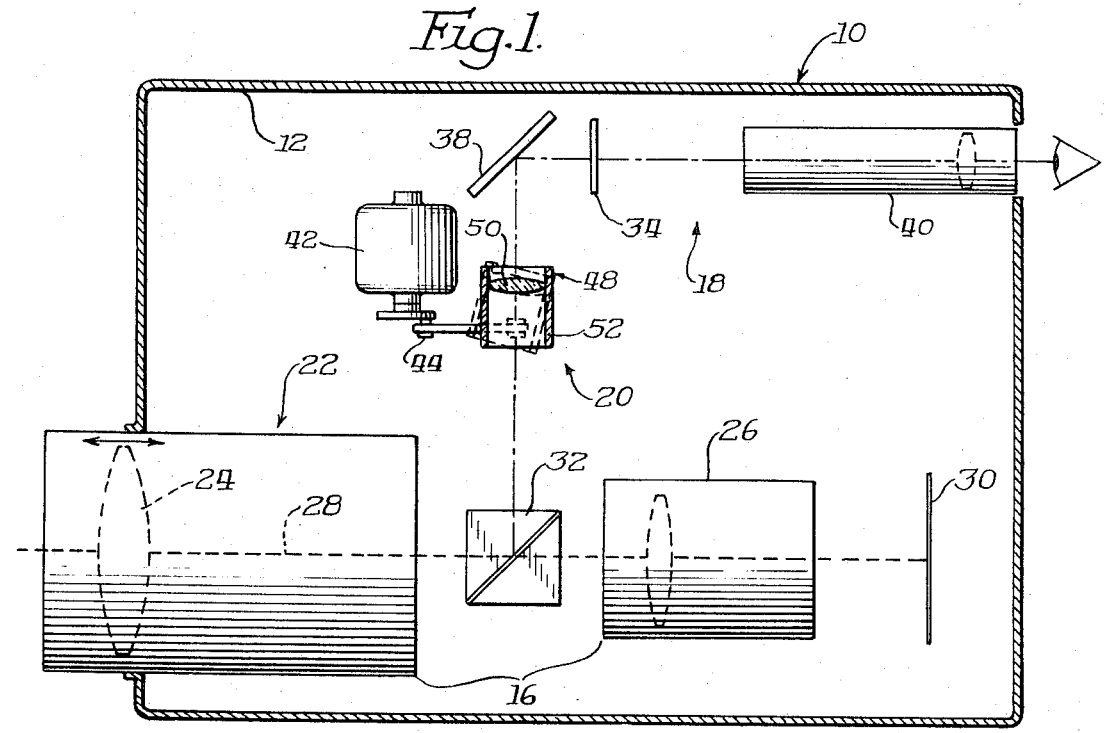

United States Patent [19]
Hartmann

[11] 3,784,305
[45] Jan. 8, 1974

[54] NODAL SLIDE RANGEFINDER
[75] Inventor: Rudolf Hartmann, Skokie, Ill.
[73] Assignee: Bell & Howell Co., Chicago, Ill.
[22] Filed: Apr. 18, 1972
[21] Appl. No.: 245,220

[52] U.S. Cl.................................. 356/3, 356/16
[51] Int. Cl............................................ G01c 3/04
[58] Field of Search................... 95/45, 45 C, 45 R; 353/101; 351/6; 356/23, 24, 27, 3, 16, 17

[56] References Cited
OTHER PUBLICATIONS
F. A. Jenkins & H. E. White, Fundamentals of Optics N.Y., McGraw Hill, 1957, pp. 77-78.

Primary Examiner—Ronald L. Wibert
Assistant Examiner—Steven K. Morrison
Attorney—John E. Peele, Jr. et al.

[57] ABSTRACT

A ranging device for determining instrument-to-subject distance for focusing of an objective lens of the instrument on the subject. Located in the optical path of the objective lens, the ranging device includes a drive for cyclically displacing an optical means about the nodal point of that optical means to cause an image of the subject to remain stationary on an image plane when the objective is focused thereon and to cause the image to rotate in the image plane when the objective is not focused on the subject.

7 Claims, 3 Drawing Figures

PATENTED JAN 8 1974    3,784,305

NODAL SLIDE RANGEFINDER

The present invention relates to a rangefinding method and a mechanism for use in an optical instrument having a focusable objective lens such as a camera. Particularly, it relates to a mechanism enabling visual or electronic focus determination for focusing of the objective lens.

In cameras and other optical instruments having through-the-lens or single lens reflex type viewing systems, various rangefinding methods and mechanisms have been suggested and built into such units. Generally, rangefinding or focusing systems are classified into two groups: The first group of systems requires sharpness judgment on the part of the user who must attempt to adjust the objective lens to provide the best focused image of a subject as the image is viewed on a ground glass or a fine microprism screen, or is viewed as an air-image. An improvement on this sharpness-judgment focusing system wherein optical means are introduced in the viewfinder of the instrument to cause the image viewed to be unaltered when in-focus or altered when out-of-focus. This group of systems includes the split-image rangefinder, the coarse micro-prism rangefinder, and the superimposition type rangefinder. Although these systems have proved satisfactory for most uses and applications, each has a shortcoming which is typical of that specific type of system. For example, sharpness judgment of an image viewed on a ground glass requires that the image be carefully evaluated visually. Such an image may appear sharp to the naked eye but in fact be relatively unsharp or soft insofar as actual focus of the image on the image plane is concerned. The various alignment-judgment systems are capable of causing adjustment of the lens to more critical focus conditions in that the user is usually attempting to equate focus of an image by aligning portions of the outlines of a subject.

Generally these known ranging systems require maximum aperture opening or $f$/stop settings to provide adequate viewing light and minimum depth of field. Beside reducing the quantity of light available for image viewing, smaller aperture openings also increase the depth of field so that the ability to obtain precise focusing is reduced. Hence, a ranging system operable independent of the aperture opening of the objective lens is desirable.

All optical systems have front and rear nodal which are calculated by known formulae. These effective points are characterized by the fact that the ray directed toward the front nodal point at a given angle relative to the optical axis will emerge from the rear nodal point at an equal angle relative to the optical axis. If we consider the lens system in collimated space in the absence of distortion, it becomes apparent that as the lens is oscillated or otherwise moved about the rear nodal point, the image will be independent of and unaffected by the angle of oscillation and will remain stationary. However, if the lens is not in collimated space, an object placed a distance in front of the nodal point will cause the image to oscillate about the optical axis by an excursion determined by image center displacement relative to the optical axis.

A formula for determining the excursion of the image is $$2E = 2fDr/S \text{ where}$$

$E$ represents the excursion away from the optical axis to one side thereof;
$f$ represents the focal length of the lens system;
$D$ represents the distance between nodal points of the lens system;
$r$ represents angular rotation of the lens system about the rear nodal point; and
$S$ represents the distance of an object from the front nodal point.

From the above formula, it is apparent that for an object at infinity ($S = \infty$), the total excursion ($2E$) reduces to zero. That is, the image center is not displaced from the optical axis. However, for any finite value of $S$, the excursion is increased from zero depending on the values of $f$, $D$ and $r$. This ranging system which is usable in the viewing system of an optical instrument such as a camera, functions independently of the $f$/stop value of the objective lens.

Based on evaluation of the variables in the formula, the only variable which may be changed without disruption of other optical requirements is to maximize the distance between the nodal points. That is, to select a lens design in which the nodal points are separated as far as possible. Typical of this type of lens construction are telephoto and inverted telephoto types.

The present invention provides a distance determining or rangefinding method and mechanism having means to enable visual or electronic determination of instrument-to-subject distance. Particularly, this method is based on the effects of the transmission of light rays through the nodal points of a lens or optical system. The nodal points of a particular lens or optical system are characterized as those two points so located on the optical axis of that lens that any incident ray directed through the front nodal point at a given angle will produce a parallel emergent ray directed through the rear nodal point at an equal angle. By a well known optical principle as explained above, when an image forming lens or optical system is rotated around the rear nodal point so as to displace the front end of the optical axis, the image of a subject on which the lens is focused remains stationary during movement of the lens. However, if the subject is not at focus, the image of that subject moves laterally since the nodal point would be shifted. Therefore, this principle can be used as a basis for a rangefinding method and mechanism. In an optical instrument such as a reflex camera having a focusable, variable focal length objective lens, light for the viewfinder image is obtained from the space between the zoom or variable magnification unit and the prime lens of the objective lens. A focusable fixed magnification unit may also be used in front of the image-forming prime lens. The light rays picked off from this space in the optical system are usually collimated or must least be of constant covergence or divergence. That is, these rays appear to eminate either from ininity or a constant object distance when the subject is in focus. Thus, the image of an object appearing in focus is formed in a stationary focal plane of both the finder objective and the prime lens regardless of the object distance.

To enable using the nodal slide principle in a lens system of the type described above, a component is introduced in the image viewing system and is made oscillatable around its rear nodal point. The oscillation of the component causes the image to remain stationary under the correct focus condition of the focusing portion of the zoom or fixed magnification unit of the lens system, and to move laterally when an improper focus condition exists. This phenomenon can easily be detected visually by an observer looking through the viwing system since distinguishing between a stationary image and a shifting image is readily apparent. The lens system is preferably of a design which maximizes nodal point separation such as telephoto, inverted telphoto or Petzval type lenses. Hence, the oscillation in a direction transverse to the optical axis is sufficient for easy determination.

Since the focus criteria are substantially different as evidenced by presence or absence of image motion, light-sensing means may be interposed in the optical path to generate electrical signals. As focus is apraoched, the amplitude of image motion will decrease to zero, and shift phase, before imcreasing again in amplitude as focus is passed through. The resulting signals are fed to circuitry for processing to determine the amplitude and phase. Hence the direction and amount of focusing correction necessary to cause automatic focusing of the lens on a subject becomes available. For an automatic focusing operation, an area of the scene in which the subject being focused upon is located.

Thus, an object of the present invention is to provide a novel rangefinding mechanism using the nodal point principle.

Another object of the invention is to provide a rangefinding mechanism by which the condition of focus or lack of focus is readily apparent due to effective image motion.

Figure 2:
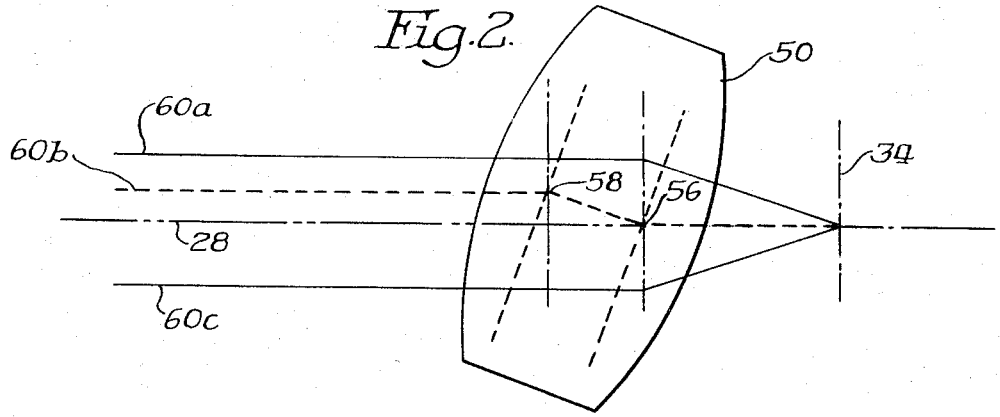
Figure 3:
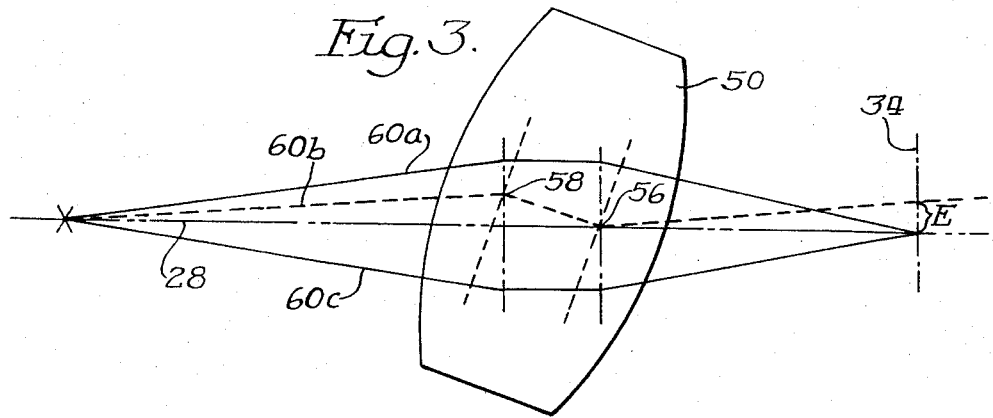

To better understand this invention and the objects thereof, reference should be made to the accompanying drawings wherein:

FIG. 1 is a schematic view of the components of the invention as applied to a motion picture camera having a variable focal length, focusable objective lens system; and FIGS. 2 and 3 are schematic representations of the oscillatable optical component imaging and in-focus and out-of-focus subject of a scene on an image plane.

Referring now to the drawings, there is shown a portion of an optical instrument, such as a camera 10, having a housing 12 substantially enclosing an objective lens 16, an image viewing system 18, and a rangefinding mechanism 20. In this preferred embodiment, the objective lens 16 is of the focusable, variable focal length type having a focusable zoom unit 22, including a focusing cell shown as element 24, and a prime unit 26. The objective lens, which forms an optical axis 28 along which light rays from a remote subject pass, images light rays of a remote subject on a first image plane along which a film 30 is transported past a gate (not shown) in the camera. Some of the light rays are deflected from the optical axis by an image reflector such as a peek-in-mirror or a beam splitter 32 and are imaged on a second image plane 34 in the vieiwing system.

The viewing system 18 includes a secondary image reflector, shown as a small mirror 38, and an eyepiece 40 adjusted with the focal plane thereof conincident with the image plane of the objective lens. The viewing system may include additional relay and erector lenses (not shown).

Focusing of the objective lens is accomplished by axial adjustment of the focusing cell or member 24 of the zoom unit 22. When the objective lens is focused on a subject at either infinity or a finite distance, the focal plane of the lens becomes coincident with the image planes in the camera. That is, the light rays from a subject upon which the lens is focused appear to be generated at ininity or a constant distance. Therefore, the rays appear collimated or of constant convergence or divergence as they emerge from the zoom unit. Likewise, light rays from subjects at planes other than that at which the objective lens is focused are not collimated or of constant convergence or divergence when they emerge from the zoom unit. Thus, the sharpness of an image formed on the image planes will be responsive to the focus condition of the prime unit of the objective lens.

The ranging device 20 is shown in this preferred embodiment between the zoom unit 22 defining the optical axis 28 and the image plane 34 of the viewing system. By selecting this location, the image of a subject is viewed through the optics of the device which includes three primary components shown schematically in FIG. 1 as a motive unit 42, a transmission or coupling 44, and a ranging lens cell 48. Preferably, the motive unit is a small electric motor connected to a not shown power source and control unit. The ranging lens shown as a single element 50 is a lens system of one or more elements with widely separated nodal points. The ranging lens is supported in a barrel 52, which is arranged to be oscillated about the rear nodal point 56 of the lens element. Oscillation of the lens cell is generated by the coupling 44 which connects the lens cell to the motor by known components which might include a speed reduction unit. That is, the motor and coupling complement one another to cause the ranging cell 48 to oscillate at a frequency and through a selected angle of displacement for making most apparent the presence or absence of image motion.

In an example according to this preferred embodiment, the oscillation frequency was selected at 10 cycles per second and the displacement of an image for a 10 percent focus error was selected as 2° from the center of the image. Thus, the center of an out-of-focus image would appear to oscillate rather rapidly with the image center being displaced at least 4° of the angle of view upon each cycle.

Assuming the zoom unit 22 to be focused on an object in a plane corresponding to the focal plane to which the objective lens is adjusted, the light rays emerge from the afocal unit parallel as shown in FIG. 2 by selected rays 60 a, b, c. As the ranging lens 50 oscillates about its rear nodal point 56, the rays entering the front nodal point 58 are imaged to a point in an image plane, such as plane 34. The lens is oscillated between an orientation with its axis parallel to the optical axis to another orientation displaced by an angle relative to the axis. Nevertheless, since a light ray entering a lens and passing through the nodal point of the lens emerges at an angle parallel to the entrance angle, the exiting light rays from a subject focused on remain parallel with the optical axis since these rays enter at a constant angle relative to the optical axis. Therefore, the image of the subject as seen through the viewing system appears stationary as though the ranging lens were not oscillated about its rear nodal points. Since the image is focused in the viewing system image plane, a properly focused image will be recorded in its conjugate plane on film 30.

Assuming next that the focusing cell is focused on a plane other than the plane in which the subject is located, light rays enter the ranging lens and emerge from the zoom unit at an angle relative to the optical axis. These non-collimated rays exit the nodal point of the ranging lens at an angle displaced from the optical axis. Since the lens is oscillated about a center aligned on the optical axis, light rays entering at an angle exit at an equal angle and therefore form an image with the center thereof displaced from the optical axis by a distance "E." Because the lens is oscillated with the light ray entering point displaced from the optical axis by a given amount, the image formed at the image plane is displaced a corresponding amount from the optical axis. The user, while viewing the image through the viewing system, can adjust the focus of the lens as required to cause the subject image to become stationary. Thus, the image at the film plane is in focus as is the image in the viewing system.

It is to be understood that the embodiment shown is illustrative of the principle of operation of a ranging mechanism for focusable objective lens of cameras or other optical instruments and that certain changes, alterations, and modifications can be made in the structure of the mechanism without departing from the spirit of the disclosure.

What is claimed is:

1. In an optical instrument having a focusable objective lens, an image plane receiving an image of a remote subject from said objective lens, the invention comprising:
    a ranging device for determining the distance from the instrument to the subject, and for assisting focusing of said objective lens on the subject, the ranging device including:
    optical means having a nodal point through which light rays from the subject pass generating an image of the subject on the image plane of the instrument; and
    means for cyclically displacing said optical means about said nodal point,
    whereby the image of the subject moves on said image plane when said objective lens is not focused on said subject and is stationary on said image plane when said objective lens is focused on said subject.

2. A ranging device as in claim 1 wherein said optical means includes a lens system carried in a barrel portion arranged for cyclical movement about the rear nodal point of said lens system.

3. A ranging device as in claim 2 wherein said means for periodically displacing said optical means is a drive motor.

4. A ranging device as in claim 3 wherein said drive motor for periodically displacing said lens system about said nodal point is connected to said barrel portion through a motion transfer mechanism to cause oscillation of said lens system.

5. A ranging device as in claim 4 wherein the objective lens generates an image through said ranging device on said image plane, which image is viewable through viewing means of said instrument.

6. A ranging device as in claim 5 wherein the objective lens forms an optical path in said instrument, and a reflector means is interposed in said optical path to cause an image of the subject to be formed at a first image plane for recording an image and at a second image plane for viewing of an image comparable to the image recorded, said image planes being conjugate whereby said viewable image is stationary when said recordable image is in focus.

7. In an optical instrument having a focusable objective lens, an image plane receiving an image of a remote subject from said objective lens, the invention comprising:
    a ranging device for determining the distance from the instrument to the subject for focusing of said objective lens on the subject, the ranging device including:
    optical means including a lens system having a rear nodal point through which light rays from the subject exit to form an image of the subject on an image plane of the instrument, said optical means being disposed in an optical path generated by the objective lens, and
    drive means for cyclically oscillating said optical means about said nodal point to cause the image of the subject to move on said image plane responsive to said oscillation and displaced from said optical axis when said objective lens is not focused on said subject and to cause the image to be stationary on said image plane when the objective lens is focused on the subject.

* * * * *